(12) United States Patent
Abe et al.

(10) Patent No.: US 7,499,091 B2
(45) Date of Patent: Mar. 3, 2009

(54) SOLID-STATE IMAGING DEVICE AND METHOD FOR DRIVING SAME

(75) Inventors: Takashi Abe, Kanagawa (JP); Ryoji Suzuki, Kanagawa (JP); Keiji Mabuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 433 days.

(21) Appl. No.: 10/508,234

(22) PCT Filed: Mar. 20, 2003

(86) PCT No.: PCT/JP03/03453

§ 371 (c)(1),
(2), (4) Date: Sep. 20, 2004

(87) PCT Pub. No.: WO03/079675

PCT Pub. Date: Sep. 25, 2003

(65) Prior Publication Data

US 2005/0104985 A1  May 19, 2005

(30) Foreign Application Priority Data

Mar. 20, 2002 (JP) .............................. 2002-077429

(51) Int. Cl.
*H04N 3/14* (2006.01)
*H04N 5/335* (2006.01)
(52) U.S. Cl. .................................. 348/308; 348/307
(58) Field of Classification Search ................. 348/308, 348/307
See application file for complete search history.

(56) References Cited

U.S. PATENT DOCUMENTS 5,262,871 A * 11/1993 Wilder et al. ............... 348/307
5,264,939 A   11/1993 Chang
6,130,420 A * 10/2000 Tanaka et al. ............ 250/208.1
6,163,386 A   12/2000 Kobayashi et al.

(Continued)

FOREIGN PATENT DOCUMENTS

JP         06-054265         2/1994

(Continued)

*Primary Examiner*—James M Hannett
(74) *Attorney, Agent, or Firm*—Robert J. Depke; Rockey, Depke & Lyons, LLC.

(57) ABSTRACT

A solid-state imaging device for preventing aging deterioration of image quality due to a thinning out reading mode in addition to a usual all pixel reading operation mode and maintaining a good image quality and a method for driving the same, including an imaging pixel portion 111 formed by arranging a plurality of pixels each including a photo-electric conversion element and a reading circuit of the photo-electric conversion element in a matrix, having an all pixel reading mode for reading pixel signals from all pixels of the imaging pixel portion 111 and a thinning out reading mode for intermittently selecting part of the pixels of the imaging pixel portion 111 for each pixel row or each pixel column or both of them to read out pixel signals, and having drive circuits 112 to 116 having a function of selecting the reading circuit of the imaging pixel portion 111 for each pixel row or each pixel column by a drive signal and receiving as input drive signals also with respect to the pixel rows or pixel columns thinned out at the time of driving by the thinning out reading mode to operate the reading circuit of each pixel.

7 Claims, 13 Drawing Sheets

U.S. PATENT DOCUMENTS 6,507,365 B1 * 1/2003 Nakamura et al. .......... 348/296
6,967,685 B2 * 11/2005 Hamasaki ................... 348/314

FOREIGN PATENT DOCUMENTS

| | | |
|---|---|---|
| JP | 07-131713 | 5/1995 |
| JP | 09-321267 | 12/1997 |
| JP | 2000-350103 | 12/2000 |

* cited by examiner

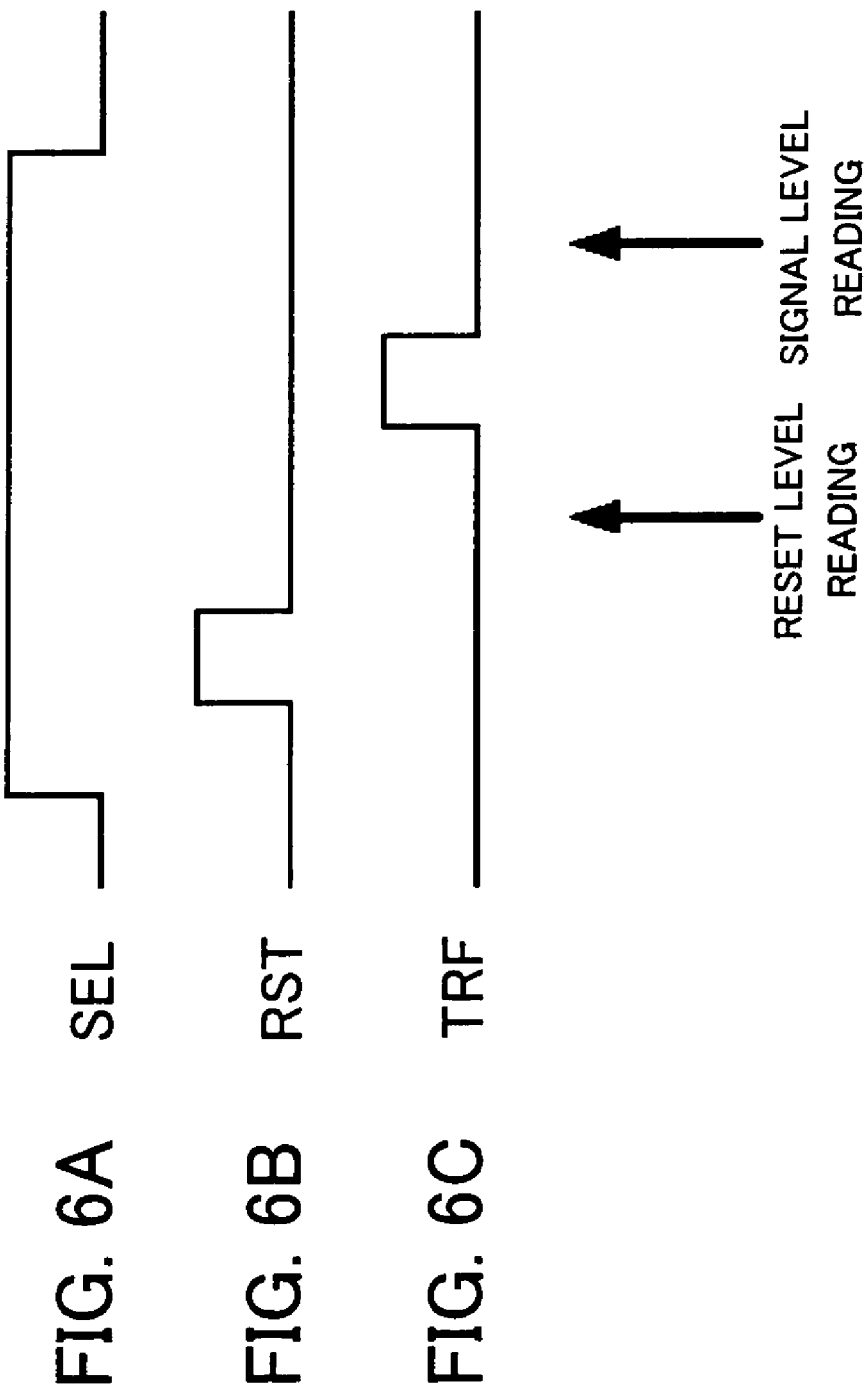

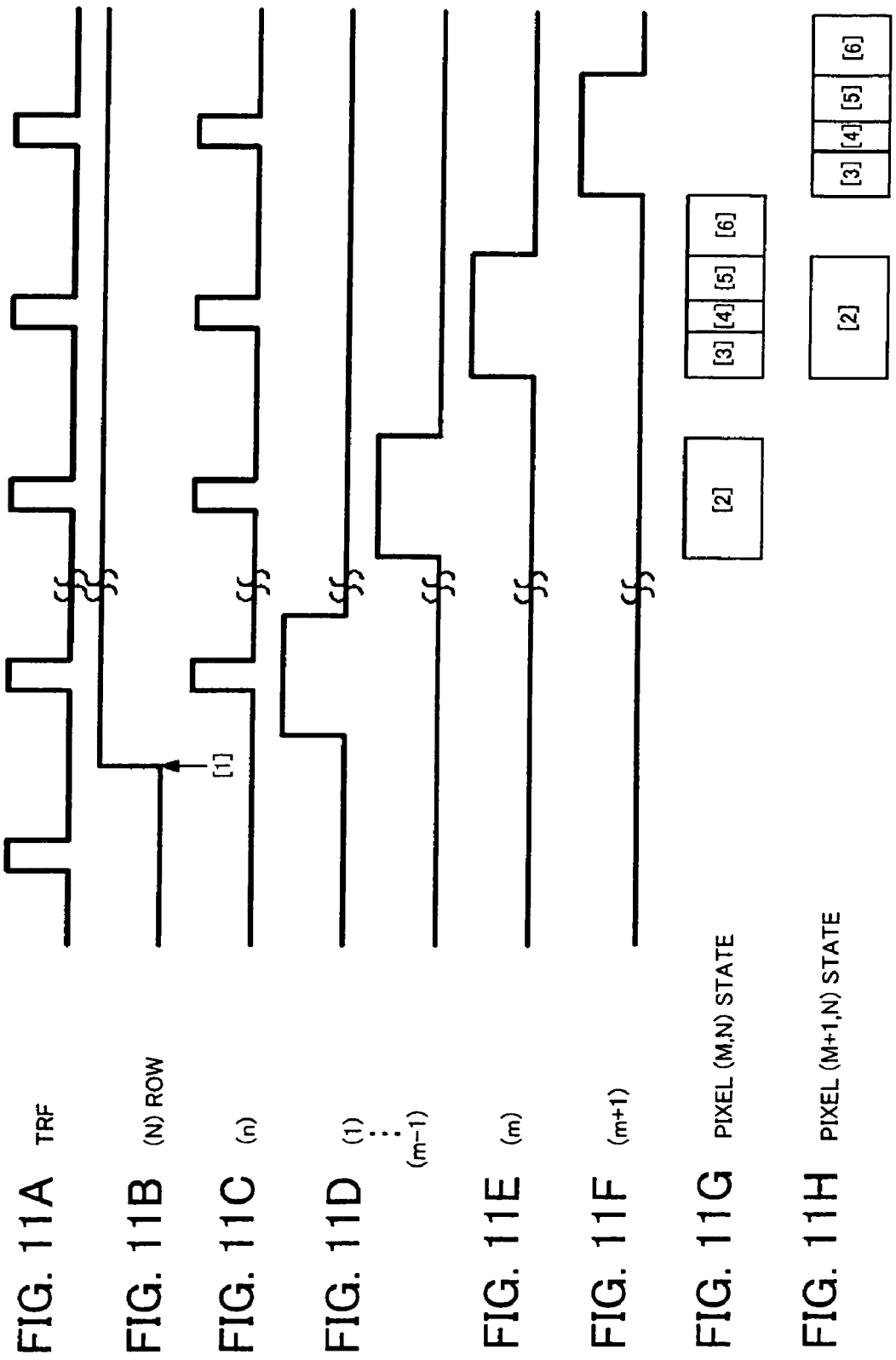

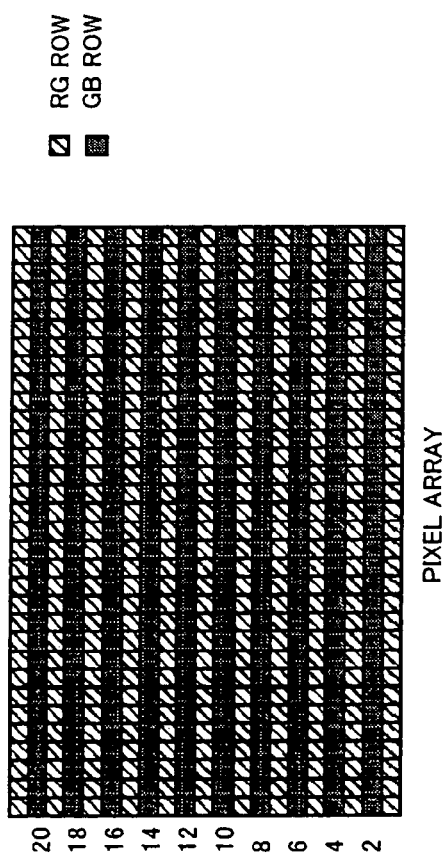
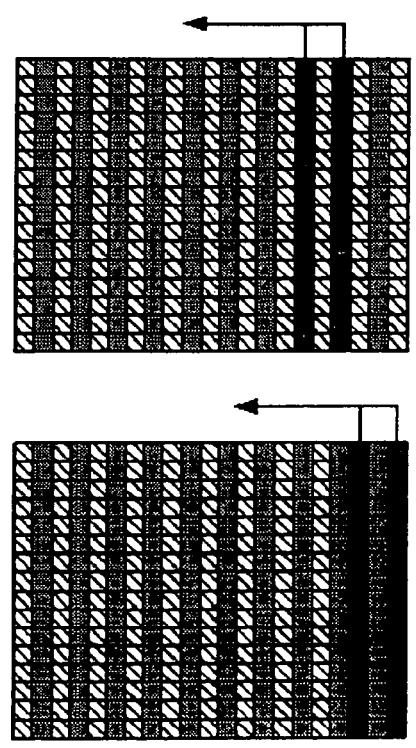
FIG. 12A PIXEL ARRAY
FIG. 12B STATE 1: FIRST ROW OF RG
FIG. 12C STATE 2: FIRST ROW OF GB
FIG. 12D STATE 3: SECOND ROW OF RG
FIG. 12E STATE 4: SECOND ROW OF GB

SOLID-STATE IMAGING DEVICE AND METHOD FOR DRIVING SAME

This application claims priority to Japanese Patent Application Number JP2002-077429, filed Mar. 20, 2002 which is incorporated herein by reference.

TECHNICAL FIELD

The present invention relates to a solid-state imaging device provided with a photo-electric conversion element and a circuit for reading the same for each of a plurality of pixels arranged in a matrix and a method for driving the same, more particularly relates to a solid-state imaging device provided with a function for thinning out pixel columns or pixel rows when reading a pixel signal and outputting the result and a method for driving the same.

BACKGROUND ART

In recent years, video cameras and electronic cameras have become very popular. These cameras use CCD type or CMOS type solid-state imaging devices.

Among these, a CMOS type image sensor has an imaging pixel portion configured by a plurality of pixels arranged in an m×n matrix and a peripheral circuit portion arranged at the periphery of this imaging pixel portion on one semiconductor chip. The CMOS type image sensor has, in each pixel of the imaging pixel portion, a photo-electric conversion element (photo-diode), a floating diffusion portion (FD portion), and a reading circuit comprised of various types of MOS transistors for transfer, amplification, etc., photo-electrically converts light incident upon each pixel by the photo-diode to generate a signal charge, transfers the signal charge to the FD portion by a transfer transistor, detects potential fluctuation of this FD portion by an amplifier transistor, converts this to an electric signal, amplifies the same, and thereby outputs a signal for each pixel from a signal line to the peripheral circuit portion.

Further, the peripheral circuit portion is provided with a signal processing circuit for applying a predetermined signal processing, for example, correlated double sampling (CDS), gain control, or A/D conversion to the pixel signals from the imaging pixel portion and a drive control circuit for driving each pixel of the imaging pixel portion and controlling the output of the pixel signal, for example, a vertical or horizontal scanner or a timing generator (TG).

In the CMOS type image sensor as explained above, a thinning out read operation making good use of the random access property providing a reading circuit for the photo-diode for each pixel is possible.

This thinning out read operation makes it possible to eliminate waste and lower power consumption in for example a digital camera equipped with a liquid crystal monitor by outputting only the information of the thinned out pixels in accordance with the resolution of the liquid crystal monitor when monitoring occupying most of the time even if the information of all pixels is output when acquiring the captured image immediately after shutter operation.

FIG. 1 is a view for explaining a ⅓ thinning out operation when outputting one row of signals per three rows as an example of the thinning out reading mode.

FIG. 1 diagrammatically shows a pixel array arranging pixels in a matrix in a sensor portion (imaging pixel portion) of a CMOS type image sensor. In FIG. 1, the outer frame indicates a sensor portion (imaging pixel portion) 1. Each grid box in this indicates a pixel 2. Only pixels indicated by hatching among the pixels are pixels read out in the thinning out reading mode. The other pixels are pixels which are not read out in the thinning out reading mode.

A pixel signal is read in units of pixel rows by the operation of for example a vertical shift register. In the usual all pixel reading operation mode, the read operation is carried out by sequentially selecting all pixel rows of the sensor portion (imaging pixel portion).

In the thinning out reading mode, the operation is carried out by sequentially selecting only the hatched pixel rows in the imaging pixel portion to perform the reading. The remaining two pixel rows of the three rows are not selected.

When scanning by such method, however, it was seen that the image characteristic deteriorated after use over a long time. The reason for that was there is a difference in the degrees of deterioration of the transistors of pixels or the driver transistors for driving the pixel interconnects between the rows to be thinned out and the rows not to be thinned out.

At the time of all pixel output, the drive frequencies of the transistors of all rows are equal, so no difference occurs in the degrees of deterioration of the same.

At the time of a thinning out operation, however, the drive frequency of a transistor is different between a row which is thinned out and a row which is not thinned out, therefore when the thinning out operation is carried out for a long time, the degrees of deterioration of the transistors of the different rows become different.

A pixel is an analog circuit handling signals with a precision of 0.1 mV, therefore when the characteristic of the transistor changes even a little, it appears as a change in characteristic of the pixel. Especially, when the degree of deterioration of the transistor characteristic is different for each row in the thinning out operation, it becomes the deterioration of the image characteristic seen by the naked eye as periodical lateral stripes at all pixel output.

DISCLOSURE OF THE INVENTION

An object of the present invention is to provide a solid-state imaging device capable of preventing deterioration with aging of the image quality in a solid-state imaging device having a thinning out reading mode in addition to a usual all pixel read operation mode and maintaining a good image quality and a method for driving the same.

According to a first aspect of the present invention, there is provided a solid-state imaging device including an imaging pixel portion formed by arranging a plurality of pixels each including a photo-electric conversion element and a reading circuit of the photo-electric conversion element in a matrix and having an all pixel reading mode for reading pixel signals from all pixels of the imaging pixel portion and a thinning out reading mode for intermittently selecting part of the pixels of the imaging pixel portion for each pixel row or each pixel column or for both of them and reading pixel signals, comprising a drive circuit having a function for selecting the reading circuit of the imaging pixel portion for each pixel row or each pixel column by a drive signal, inputting the drive signal also to a pixel row or a pixel column which is thinned out when driving by the thinning out reading mode, and thereby making the reading circuit of each pixel operate.

According to a second aspect of the present invention, there is provided a method for driving a solid-state imaging device having a function for selecting a reading circuit of an imaging pixel portion formed by arranging a plurality of pixels each including a photo-electric conversion element and a reading circuit of the photo-electric conversion element in a matrix for each pixel row or each pixel column and having an all pixel reading mode for reading pixel signals from all pixels of the imaging pixel portion and a thinning out reading mode for intermittently selecting part of the pixels of the imaging pixel portion for each pixel row or each pixel column or for both of them and reading pixel signals, inputting the drive signal also to a pixel row or a pixel column which is thinned out when driving by the thinning out reading mode, and thereby making the reading circuit of each pixel operate.

In the solid-state imaging device of the present invention, the drive signal is also input to a pixel row or a pixel column thinned out when driving by the thinning out reading mode to thereby make the reading circuit of each pixel operate, therefore it becomes possible to make the degrees of deterioration of transistors etc. configuring the reading circuits uniform by eliminating the difference of the drive frequencies between the pixels thinned out and the pixels not thinned out, so occurrence of stripe-like noise of the image when reading all pixels can be prevented, and a good image quality can be maintained.

Further, in the method for driving a solid-state imaging device of the present invention, the reading circuit of each pixel is operated by also inputting the drive signal to a pixel row or a pixel column thinned out when driving by the thinning out reading mode, therefore it becomes possible to make the degrees of deterioration of transistors etc. configuring the reading circuits uniform by eliminating the difference of the drive frequencies between the pixels thinned out and the pixels not thinned out, so occurrence of stripe-like noise of the image when reading all pixels can be prevented, and a good image quality can be maintained.

BRIEF DESCRIPTION OF THE DRAWINGS

FIG. 6A to FIG. 6C are timing charts of the drive signal when performing a read operation from each pixel.

FIG. 11A to FIG. 11H are views of signals when reading from pixels (m, n) of FIG. 10.

FIG. 12A to FIG. 12E are views for explaining a ⅖ thinning out (including addition) operation in the CMOS image sensor shown in FIG. 8.

BEST MODE FOR WORKING THE INVENTION

Below, an explanation will be given of an embodiment of a solid-state imaging device according to the present invention and a method for driving the same in relation to the attached drawings.

First Embodiment

Figure 1:
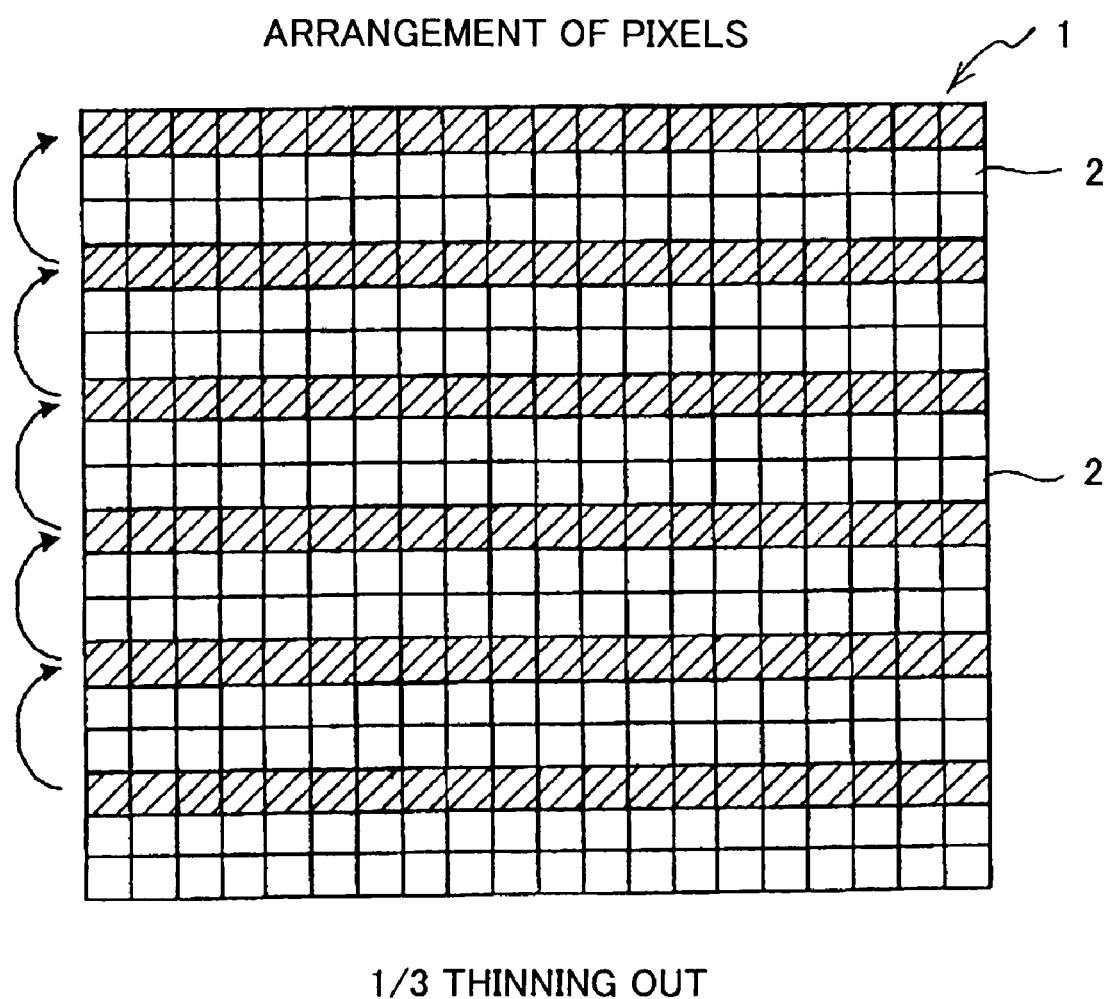
FIG. 1 is a view for explaining an example of the operation of a thinning out reading mode in a conventional CMOS image sensor.
Figure 2:
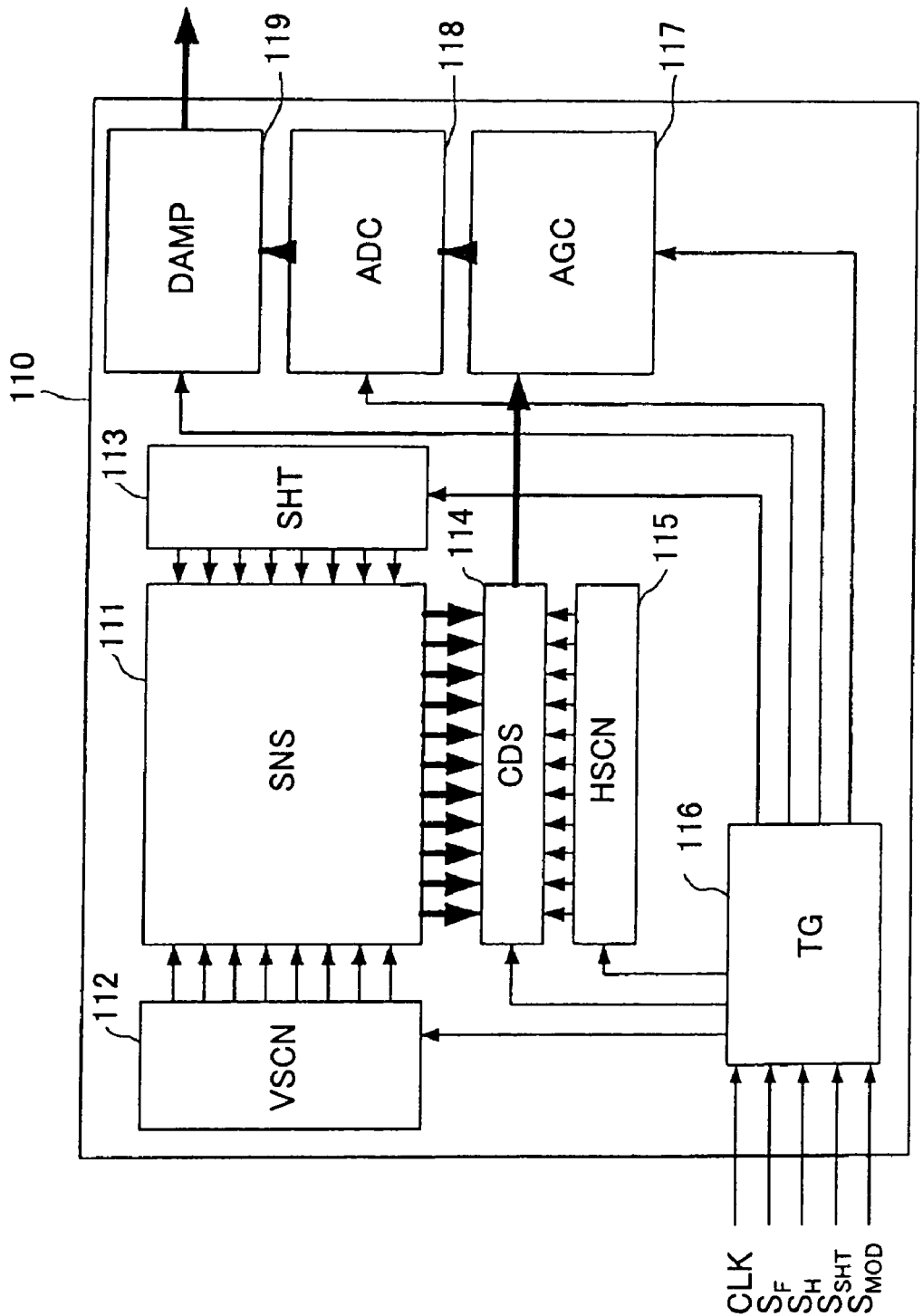
FIG. 2 is a block diagram of a first embodiment of the CMOS image sensor as a solid-state imaging device according to the present invention.

FIG. 2 is a block diagram of a first embodiment of a CMOS sensor as a solid-state imaging device according to the present invention.

A CMOS image sensor 100 of FIG. 2 is a CMOS sensor of a type for reading from pixels all together in unit of rows and, as will be explained in detail later, has two reading modes of an all pixel reading mode and a thinning out reading mode.

In the CMOS image sensor 100, as shown in FIG. 2, one semiconductor chip (sensor chip) 110 is formed with a pixel portion (sensor portion: SNS) 111 formed by arranging a plurality of pixels on the semiconductor chip in an m×n matrix, a reading row selection circuit (VSCN: here including also the drive circuit of the row) 112 for outputting a signal to the pixel row performing the reading, a shutter row selection circuit (SHT: including also the drive circuit of the row) 113 for outputting a signal to the pixel row performing the electronic shutter operation, a correlated double sampling (hereinafter referred to as "CDS") circuit 114 provided for each column and subtracting a difference between a signal level from the pixel and a reset level and eliminating fixed fluctuation for each pixel, a column selection circuit (HSCN) 115 as a selection circuit for sequentially selecting the CDS circuit 114 and outputting the signal thereof, a timing generator (TG) 116 for generating and supplying a signal to each block under the control of an external digital signal processor (DSP), an auto gain control (AGC) circuit 117 for amplifying the signal of each pixel output from the CDS circuit 114 with a desired gain, an analog/digital conversion circuit (hereinafter, referred to as an "ADC") 118 for converting a signal from the AGC circuit 117 to a digital signal, and a digital amplifier (DAMP) 119 for amplifying the digital signal of the ADC 118 and outputting the result.

The semiconductor chip (sensor chip) 110 is controlled by a signal from the external DSP. As the signal from the outside, there are an overall clock CLK, a frame start signal SF, an H start signal SH, and a signal SMOD for determining the operation mode etc.

Figure 3:
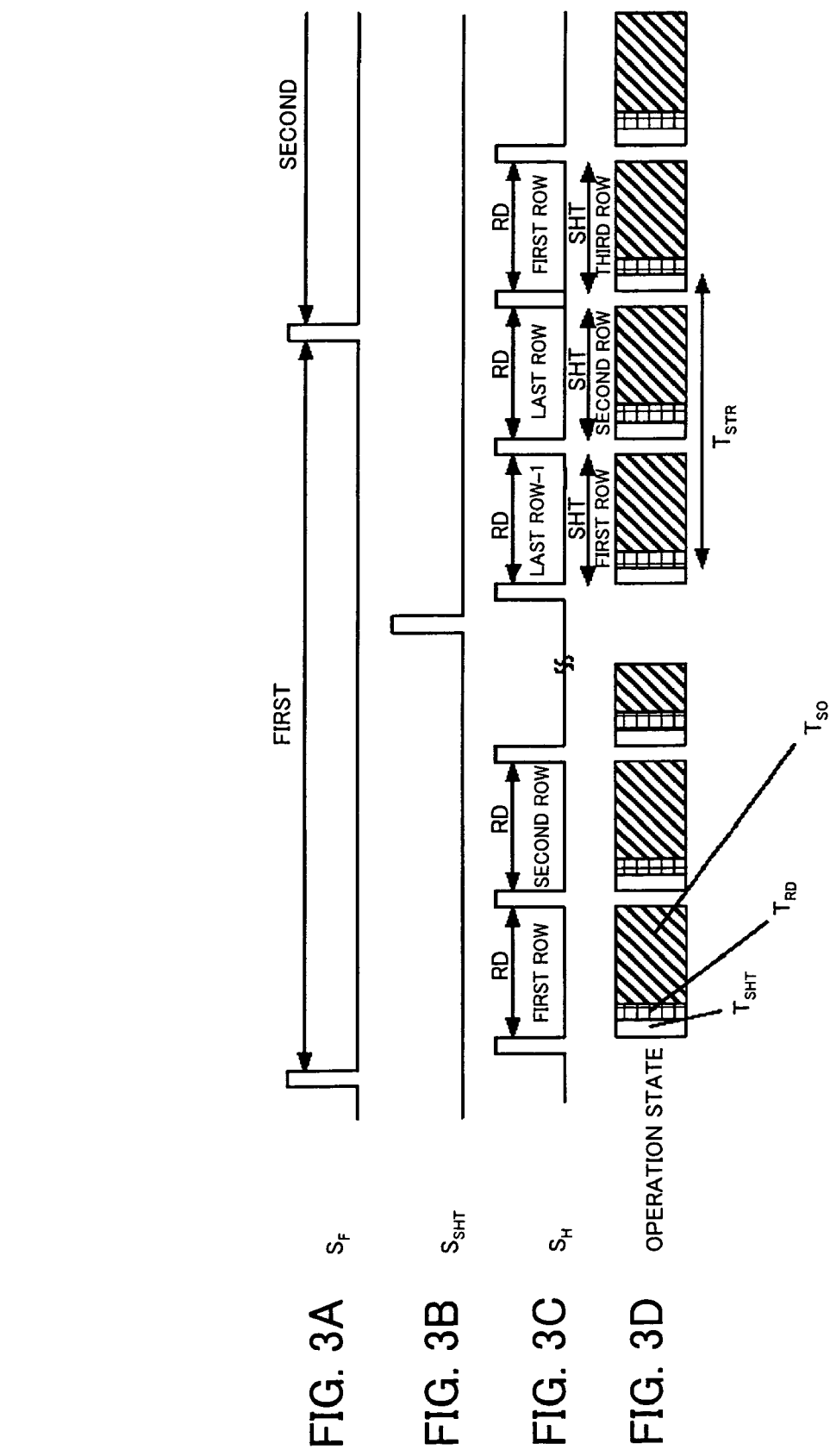
FIG. 3A to FIG. 3D are timing charts for explaining the operation of the circuit of FIG. 2.

Among them, the frame start signal SF, the H start signal SH, etc. are shown in FIG. 3A to FIG. 3D. The explanation will be given of how the sensor is operating. Here, FIG. 3A shows the frame start signal SF, FIG. 3B shows a shutter row start signal SSHT, FIG. 3C shows the H start signal SH, and FIG. 3D shows the operation state. Further, in FIG. 3C, RD indicates a read operation, and SHT indicates a shutter operation, and in FIG. 3D, TSHT indicates a shutter operation period, TRD indicates a reading period from the pixel to the CDS circuit 114, TSO indicates a period for selecting the CDS circuit 114 of each column and outputting the same to each portion, and TSTR indicates an exposure (storage) period.

When receiving the frame start signal SF and the H start signal SH from the outside, the reading row selection circuit 112 selects the first row of the pixel array of the sensor portion 111 by the timing generator 116.

The signal is output from each pixel belonging to the selected row to the CDS circuit 114 provided for each column, stripped of fixed pattern noise for each pixel, and stored in each CDS circuit 114. This reading from the pixel to the CDS circuit 114 is carried out in the "reading period TRD from the pixel to the CDS circuit" in FIG. 3D.

Next, when the "period TSO for selecting the CDS circuit of each column and outputting the same to the outside", first, the column selection circuit selects the CDS circuit 114 of the first column.

The information stored in the selected CDS circuit 114 is transferred to the AGC circuit 117. After an appropriate gain is applied, it is further processed at the ADC 118 and the digital amplifier 119 and output to the outside of the sensor chip 110.

Thereafter, the column selection circuit 113 selects the CDS circuit 114 of the next column, and the information from the selected CDS circuit 114 is processed and output.

This operation is carried out for all columns, whereby one row of pixels' worth of information is output all at once. The processing up to here is carried out in the "period TSO for selecting the CDS circuit of each column and outputting the same to the outside". When one row's worth of information is read out, after a while, the H start signal SH is input to the reading row selection circuit 112 from the timing generator 116.

The reading row selection circuit 112 selects the next row of the pixel array of the sensor portion 111 and performs a reading operation the same as that for the first row with respect to the row. The above H operation is repeated. When the selection and reading are carried out up to the last row by the reading row selection circuit, one frame's worth of the information has been output to the outside.

Next, when the frame start signal SF is input to the reading row selection circuit 112 from the timing generator 116, it starts to output one frame's worth of the information to the outside again.

From the timing generator 116, other than this, a signal SSHT for determining the timing of the start of the shutter row is input to the shutter row selection circuit 113. In the same way as the reading row selection, when receiving the signal SSHT of the start of the shutter operation and the H start signal SH enters, the pixel of the first row is driven, but the signal is not transferred to the CDS circuit 114, and only the reset of the information stored in the pixel is carried out. Thereafter, whenever the H start signal SH enters, the row to be selected by the shutter row selection circuit 113 is successively advanced.

The shutter operation is carried out in the period different from the "reading period TRD from pixel to CDS" and the "period TSO for selecting the CDS circuit of each column and outputting the same to the outside". By adjusting the time from when this shutter operation is carried out to when the reading operation is carried out, an exposure time (storage time) TSTR with respect to the light receiving element is adjusted (a 2 H period in FIGS. 3A to 3D).

Figure 4:
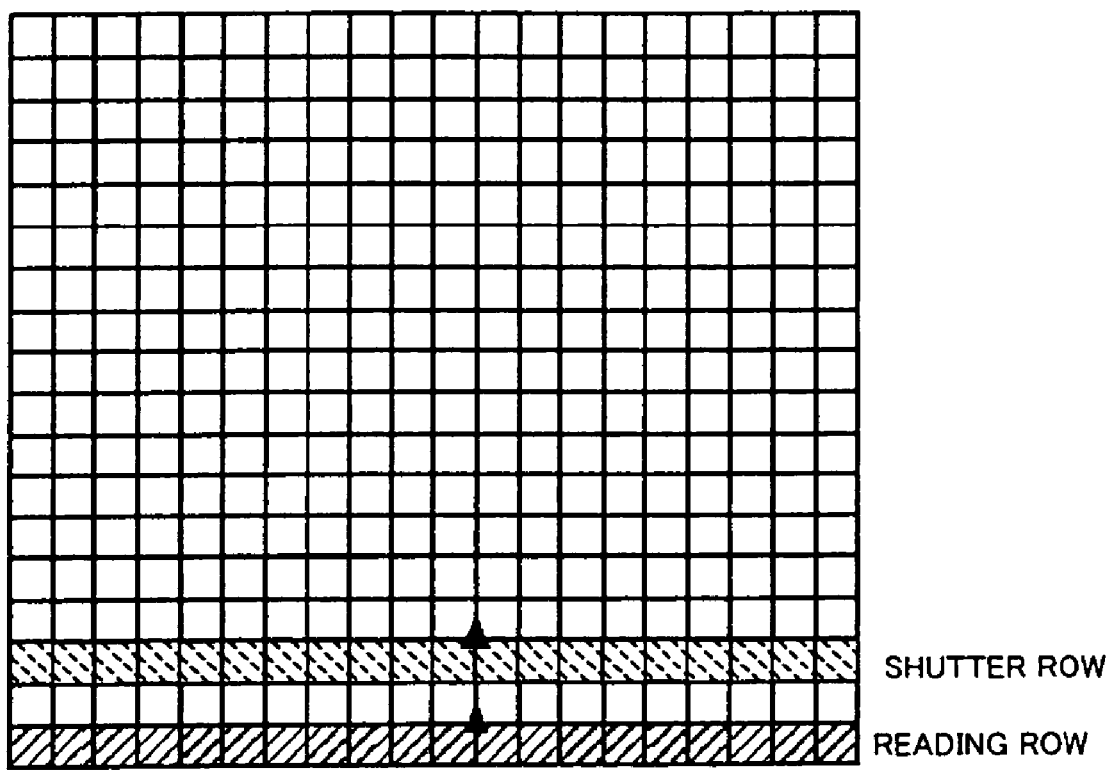
FIG. 4 is a view for explaining the relationship between a shutter row and a reading row on a pixel array.

As the image on the pixel array, as in FIG. 4, the shutter operation row and the reading operation row are incremented in a state deviated by the amount of two rows.

The description hitherto was an example of an CMOS image sensor of the type for reading from pixels in units of rows all together, but there are also examples of providing a CDS circuit for each of a plurality of columns, providing the ADC outside of the chip, providing the same for each column, etc. Further, the signals between the DSP and the chip include a variety of signals, for example, a signal directly inputting the shutter row start signal from the outside.

Figure 5:
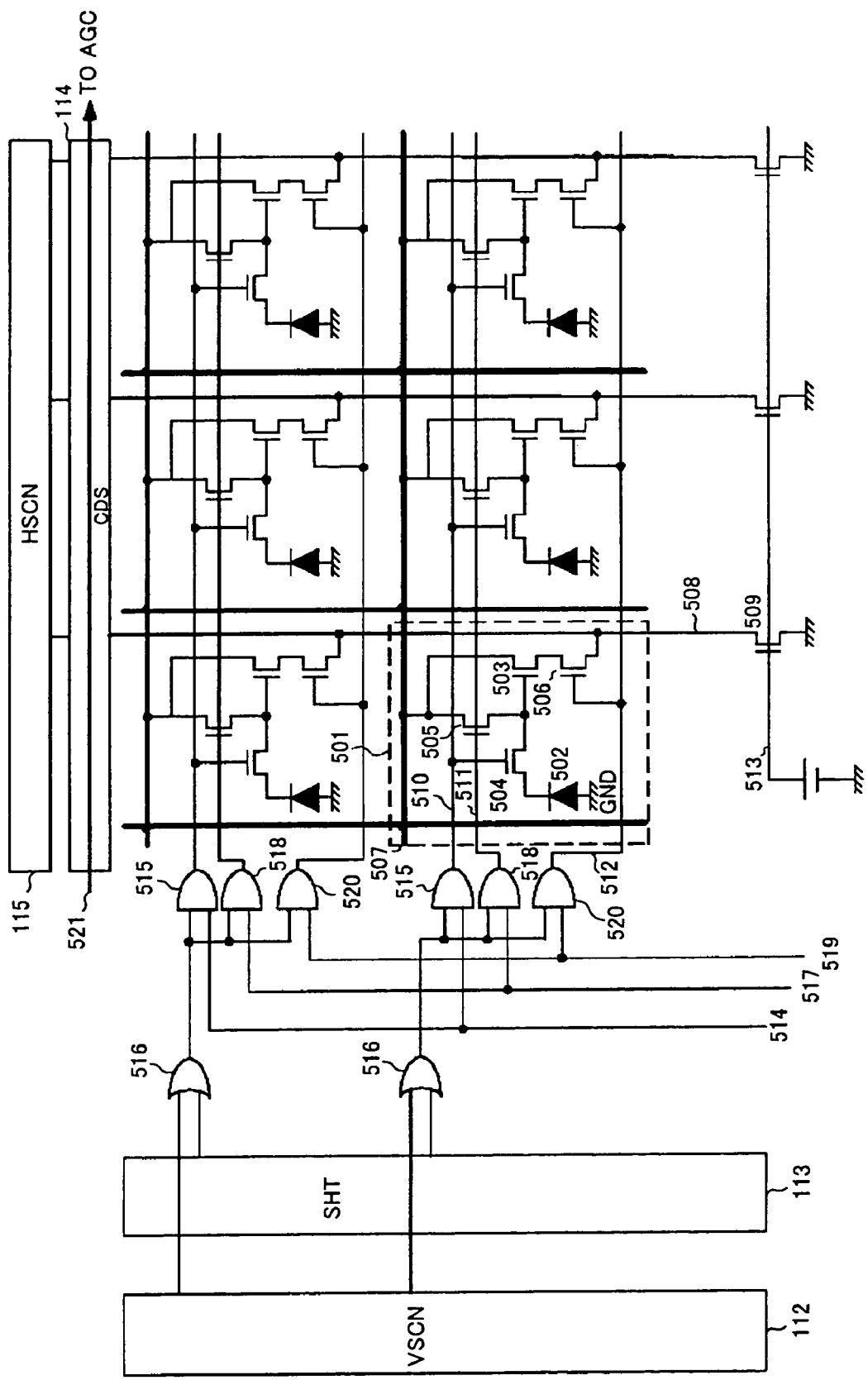
FIG. 5 is a circuit diagram concretely showing the relationship between the sensor portion of FIG. 2 and the peripheral circuits thereof.

Next, FIG. 5 shows a detailed example of the sensor portion and the reading row selection circuit etc.

In FIG. 5, the region surrounded by a broken line 501 corresponds to a unit pixel. The light receiving portion is configured by arranging them two-dimensionally. The unit pixel 501 is comprised of one photo-electric conversion element 502 and a plurality of transistors 503 to 506. The photo-electric conversion element 502 receives light and stores the signal charge.

The transistor 503 is a transistor for amplifying a signal charge, the transistor 504 is a transfer use transistor for transferring a signal charge stored in the photo-electric conversion element 502 to a gate electrode portion of the transistor 503, the transistor 505 is a reset transistor for resetting a gate electrode potential of the transistor 503, and the transistor 506 is a selection use transistor for selecting the output pixel. Further, both of the drains of the reset transistor 505 and the amplification use transistor 503 are connected to a power supply potential supply line 507. Reference numeral 508 indicates a pixel output line, and reference numeral 509 indicates a transistor for supplying a constant current to a pixel output line 508.

When the selection use transistor 506 turns on, the amplification use transistor 503 and the transistor 509 operate as a source follower, and a potential having a certain constant voltage difference from the gate potential of the amplification use transistor 503 appears on the pixel output line 508.

Reference numeral 510 indicates a transfer signal line for controlling the gate potential of the transfer use transistor 504, 511 indicates a reset signal line for controlling the gate potential of the reset use transistor 505, 512 indicates a selection signal line for controlling the gate potential of the selection transistor 506, and 513 indicates a constant potential supply line for supplying the fixed potential that performs a saturated region operation for supplying a certain constant current to the gate.

Further, a terminal 514 is a pulse terminal for supplying the transfer pulse to a transfer signal line 510 of each row and connected to an input end of a row selection use AND gate 515. Another input end of the AND gate 515 has the output from an OR gate 516 connected to it. The output end of the AND gate 515 is connected to the transfer signal interconnect 510.

The input of the OR gate 516 has the outputs from the reading row selection circuit 112 and the shutter selection circuit 113 connected to it.

The terminal 517 is the pulse terminal for supplying the reset pulse to the reset signal line 511 of each row and connected to the input end of the row selection use AND gate 518. Another input terminal of the AND gate 518 has the output from the OR gate 516 connected to it. The output end of the AND gate 518 is connected to the reset signal line 511.

A terminal 519 is a pulse terminal for supplying the selection pulse to the selection signal line 512 of each row and connected to the input end of the row selection use AND gate 520. Another input end of the AND gate 520 has the output from the OR gate 516 connected to it. The output end of the AND gate 520 is connected to the selection signal line 512.

By such a configuration, each control pulse is supplied to only each signal line of the row selected by the reading row selection circuit 112 or the shutter selection circuit 113.

The reading operation from each pixel is carried out as follows by adding drive signals as shown in FIG. 6A to FIG. 6C A selection signal SEL shown in FIG. 6A represents a signal given to the selection signal line 512 of FIG. 5, a reset signal RST shown in FIG. 6B represents a signal given to the reset signal line 511, and a transfer signal TRF shown in FIG. 6C indicates a signal given to the transfer signal line 510.

First, the selection transistor 506 and the reset transistor 515 of the row to be read out are made the conductive state, and the gate electrode portion of the amplification use transistor 513 is reset. After making the reset transistor 515 nonconductive, a voltage corresponding to the reset level of each pixel is read out to the CDS circuit 114 of the latter stage and stored.

Next, the transfer transistor 504 is made conductive, and the charge stored in the photo-electric conversion element 502 is transferred to the gate electrode portion of the amplifier transistor 503. After the end of the transfer, after making the transfer transistor 504 nonconductive, the voltage of a signal level in accordance with the amount of stored charge is read out to the latter CDS circuit 114.

The CDS circuit 114 finds the difference between the previously read out reset level and the signal level and cancels out the fixed pattern noise occurring due to variation etc. of the threshold value Vth of the reading transistor for each pixel. When the signal stored in the CDS circuit 114 is selected by the column selection circuit 115, it is read out to a latter circuit such as an AGC through a horizontal signal line 521 and processed.

The example of a general sensor portion, drive circuit, and drive signal was explained above, but other than this there are pixels having a variety of configurations, for example pixels having different numbers of transistor and pixels using capacitance. There are drive signals for all configurations. Further, for the reading row selection circuit 112, the shutter row selection circuit 113, and the column selection circuit 115, use is made of a shift register (controlled by the scanning start signal and clock) etc. Other than this, also a decoder etc. are used for raising the degree. of freedom of selection.

As explained above, the CMOS image sensor 100 of FIG. 2 is a CMOS sensor of the type for reading from pixels in unit of rows at one time and has two reading modes of the all pixel reading mode and the thinning out reading mode.

At the time of all pixel reading, the shutter and reading row selection circuit sequentially select all rows from the first row to the last row.

On the other hand, when the operation is to be performed with a high frame rate or when the amount of information per frame must be reduced, the selection at the row selection circuit is not carried out with respect to all rows, but carried out for one row for each m number of rows. Sometimes a 1/m thinning out operation is carried out.

Due to this operation, the amount of information per frame can be made 1/m, and the imaging speed can be made m times. The switch to the thinning out operation is carried out by the input of the signal for switching the operation mode to the 1/m thinning out mode from the outside and the switch of the drive signal sent to each block from the timing generator 116 for the 1/m thinning out use.

At the time of the all pixel reading mode, when the H start signal SH is input, the reading row selection circuit 112 outputs the drive signal to one advance row, but in the 1/m thinning out, when the H start signal SH is input, the drive signal is output to m number of advance pixel rows.

Further, with respect to the thinning out in the column direction, in the same way as above, the operation of the column selection circuit 115 is switched by the signal from the timing generator 116. Alternatively, it is carried out by switching an output path from the pixels to the CDS circuit 114.

In the present embodiment, when performing the 1/m thinning out operation, the rows thinned out, occupying (m−1) rows among m number of rows, are selected by the shutter row selection circuit for exactly the number the same as the number of times of selection as the reading row of the rows not thinned out and the shutter row.

Below, the specific technique thereof will be explained.

FIG. 7 diagrammatically shows a state where the technique of the present invention is applied and the ⅓ thinning out is carried out.

The reading row selected by the reading row selection circuit 112 and the electronic shutter row selected by the shutter row selection circuit 113 proceed from the bottom to the top. The electronic shutter row proceeds preceding the signal output row, but five electronic shutter rows are selected as in the figure.

Figure 7B:
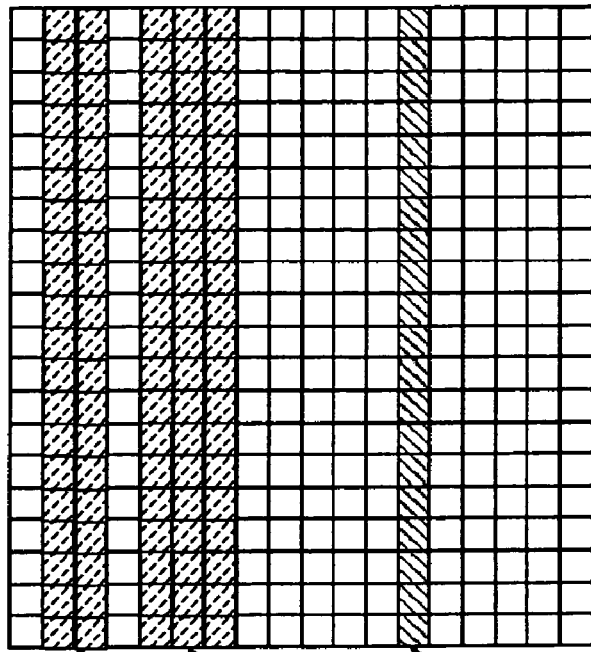
FIG. 7A and FIG. 7B are views for explaining a ⅓ thinning out operation in the circuit of FIG. 2.
Figure 7A:
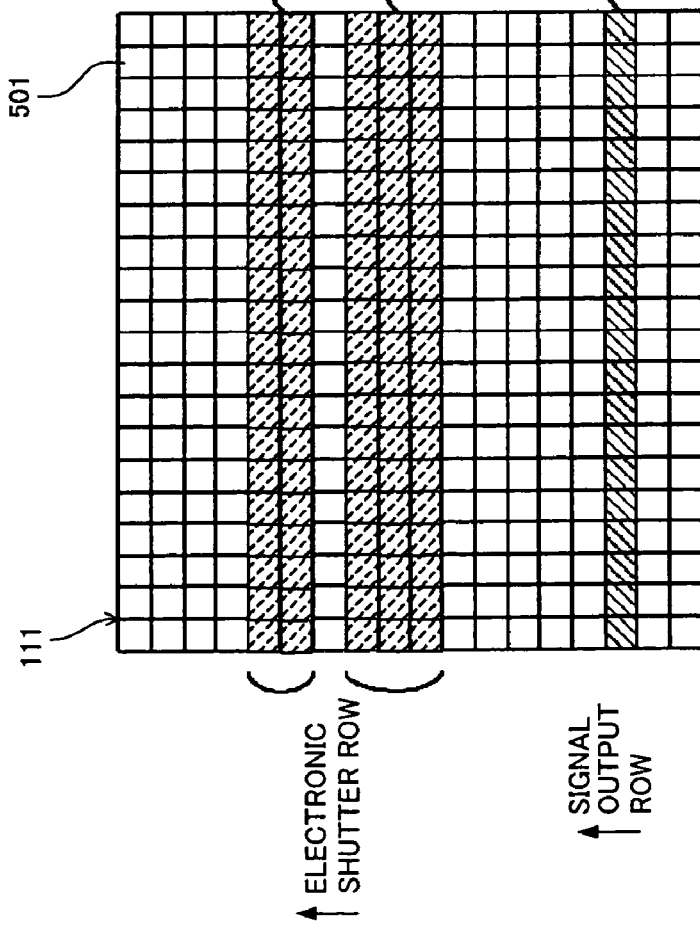

In the state of FIG. 7A, after the end of the shutter and reading operation, the read operation from each CDS circuit 114 is carried out. Until the read operation of the next row is started, both of the reading row selection circuit 112 and the shutter row selection circuit 113 are set to states selecting three advance rows to achieve the state of FIG. 7B. In the state of FIG. 7B, after the end of the shutter and reading operation, the operation of selecting three advance rows is carried out again.

As seen from the figure, one out of three rows not thinned out is selected one time as the electronic shutter row and selected one time as the reading row. Two out of the three rows thinned out are selected as the electronic shutter rows two times. Due to this, the total number of times of selection becomes the same for both of the rows thinned out and the rows not thinned out. The degrees of deterioration of the transistors become the same. Accordingly, even if the all pixels are read out after they are used in the thinning out operation for a long time, periodical stripes due to a difference in characteristics between the rows thinned out and the rows not thinned out are not generated.

The expandability to general 1/m thinning out is clear.

In this example, the drive of a row thinning out operation was explained, but thinning out in the column direction is carried out in the same way as the above. When selecting and outputting a CDS circuit 114 for every other m number of columns by the column selection circuit 115, it is possible to prepare dummy signal lines for the CDS circuits belonging to the columns thinned out and discard the signals of the CDS circuits of the columns thinned out to the dummy signal lines or cutting the output paths from the pixels to the CDS circuits.

Since a plurality of columns and rows are simultaneously driven, when the shutter row selection circuit 113 is a simple shift register or the like, a plurality of scanning start signals are input. Further, it can be also considered to prepare a plurality of shift registers per se and scan each, but it is also possible to employ a circuit configuration comprised of decoders etc. and capable of simultaneously selecting a plurality of rows by one row selection circuit.

The above invention is not only applicable to the blocks and circuit configurations of FIG. 2 and FIG. 5. The technique per se for driving the rows and columns thinned out by the shutter row can also be applied to a case where the pixel structure, the block configuration, the drive circuit, and the signals handled inside are different. Further, it is an effective technique also for the addition and thinning out addition operations explained in the second embodiment explained next.

Second Embodiment

Figure 8:
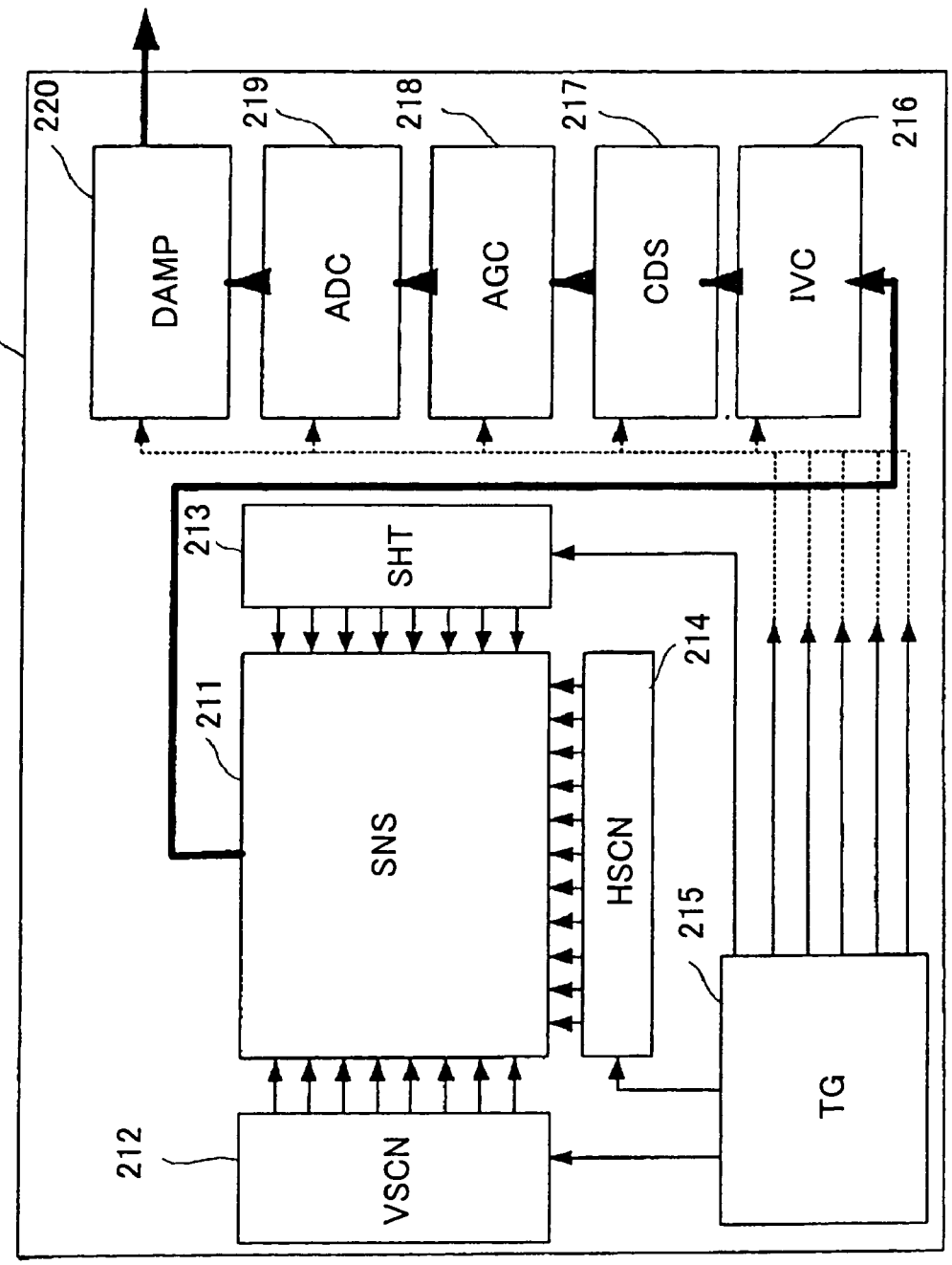
FIG. 8 is a block diagram of a second embodiment of the CMOS image sensor as a solid-state imaging device according to the present invention.

FIG. 8 is a block diagram of a second embodiment of a CMOS sensor as a solid-state imaging device according to the present invention.

A CMOS image sensor 200 of FIG. 8 is the CMOS sensor of a type sequentially selecting pixels arranged in a matrix one pixel at a time by row and column and obtaining the output from the pixel by current. In the same way as the CMOS image sensor 100 according to the first embodiment, it has two reading modes of the all pixel reading mode and the thinning out reading mode.

In the CMOS image sensor 200, as shown in FIG. 8, one semiconductor chip (sensor chip) 210 is formed with a pixel portion (sensor portion: SNS) 211 formed by arranging a plurality of pixels on the semiconductor chip in an m×n matrix, a reading row selection circuit (VSCN: here including also the drive circuit of the row) 212 for outputting a signal to the pixel row performing the reading, a shutter row selection circuit (SHT: including also the drive circuit of the row) 213 for outputting a signal to the pixel row performing the electronic shutter operation, a column selection circuit (HSCN) 214 for sequentially selecting pixels of signal output rows of the sensor portion 211, a timing generator (TG) 215 for generating and supplying signals to blocks under the control of the external DSP, a current/voltage conversion circuit (IVC) 216 for converting the current signal from a pixel of the sensor portion 111 to a voltage signal, a CDS circuit 217, provided for each column, for subtracting a difference between the signal level and the reset level from each pixel converted to the voltage value at the IVC 216 and eliminating the fixed fluctuation for each pixel, an AGC circuit 218 for amplifying the signal of each pixel output from the CDS circuit 114 with a desired gain, an ADC 219 for converting the signal from the AGC circuit 217 to the digital signal, and a digital amplifier (DAMP) 220 for amplifying and outputting the digital signal by the ADC 218.

The semiconductor chip (sensor chip) 210 is controlled by a signal from an external DSP. As the signal from the outside, there are the entire clock CLK, the frame start signal SF, the H start signal SH, and the signal SMOD for determining the operation mode etc.

Figure 9:
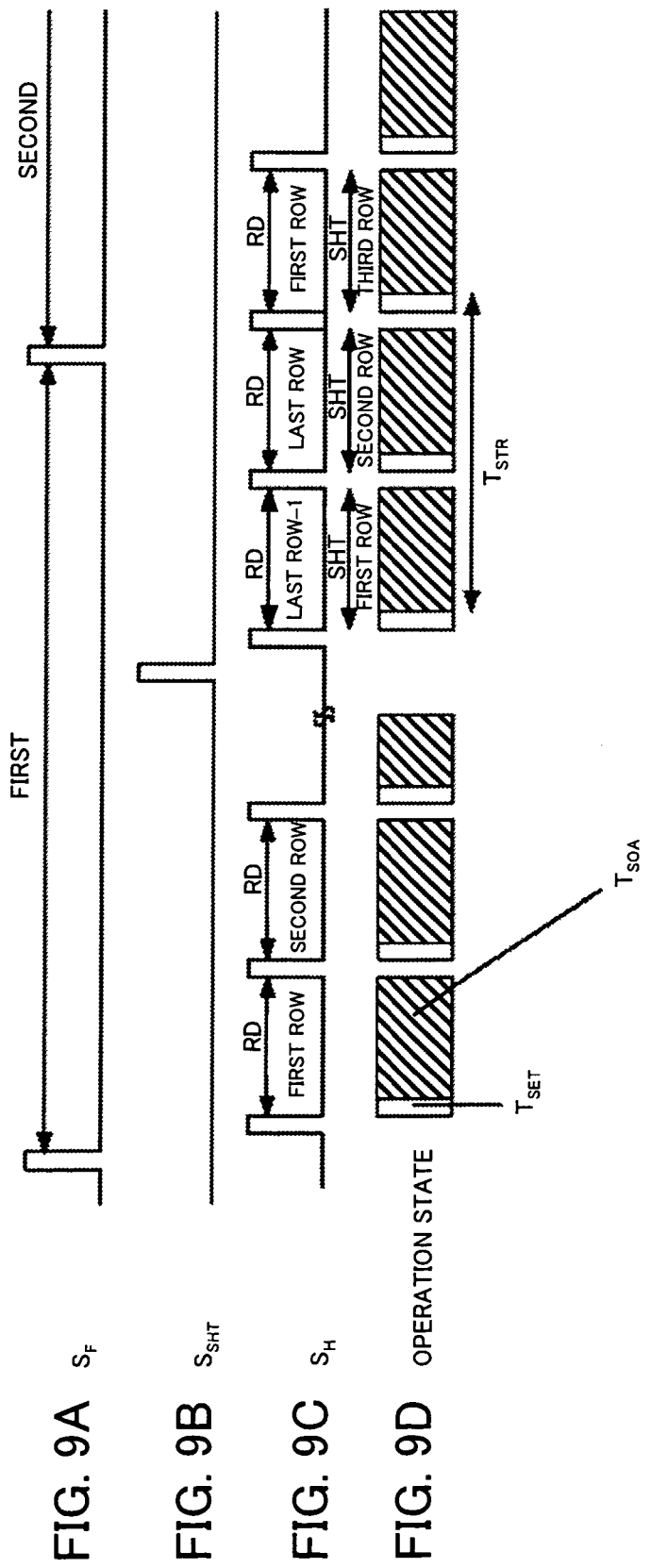
FIG. 9A to FIG. 9D are timing charts for explaining the operation of the circuit of FIG. 8.

FIG. 9A to FIG. 9D show operation states of signals and sensors of the frame start signal SF, the H start signal SH, etc. in the second embodiment. Here, FIG. 9A shows the frame start signal SF, FIG. 9B shows a shutter row start signal SSHT, FIG. 9C shows the H start signal SH, and FIG. 9D shows the operation state. Further, in FIG. 9C, RD indicates a reading operation, SHT indicates a shutter operation, and in FIG. 9D, TSET indicates the reading and shutter row setting period, TSOA indicates the period for selecting each pixel of the reading row, reading the same to the outside of the chip, selecting each pixel of the shutter row, and reading and abandoning the signal, and TSTR indicates the exposure (storage) period.

The signal from the external DSP, the frame start signal SF, the H start signal SH, the shutter start signal SSHT, etc. are the same as those of the first embodiment.

In the case of the second embodiment, when the H start signal SH is input, the device enters the "set-up period TSET of the reading and shutter row" first, and each selected row is incremented. Thereafter, when it enters the "period TSOA for selecting each pixel of the reading row and selecting each pixel of the reading & shutter row to the outside of the chip and reading and abandoning the signal", the signal of the pixel of the column selected by the column selection circuit 214 is processed by the circuits such as IVC and CDS and output to the outside of the chip.

After a while after the end of the output from one pixel, the column selection circuit 214 selects the next column to output the signal of the selected pixel. When the selection and reading up to the pixel of the last column are ended by the column selection circuit 214, after a while, the H start signal SH is input, and the selected row is incremented. When the reading of the signal up to the last row is ended by the reading row selection circuit 212, one frame's worth of the image information has been output to the outside.

Further, the shutter row selection circuit 213 is driven by a signal prepared by the DSP or the timing generator 215. The pixel of the row selected by the shutter row selection circuit 213 is driven by the column selection circuit 214 in the same way as the pixel of the reading row, but the signal from the pixel of the shutter row is not read out up to the latter stage. The exposure (storage) period to the pixel is determined in the same way as the first embodiment by the interval of the shutter row and the reading row.

Note that the block diagram shown in FIG. 8 is an example of a CMOS image sensor for sequentially selecting one pixel at a time by row and column. There are a variety of sensors, for example, one providing an ADC on the outside of the chip and one receiving as input the shutter row start signal directly from the outside as the signal between the DSP and the chip.

Figure 10:
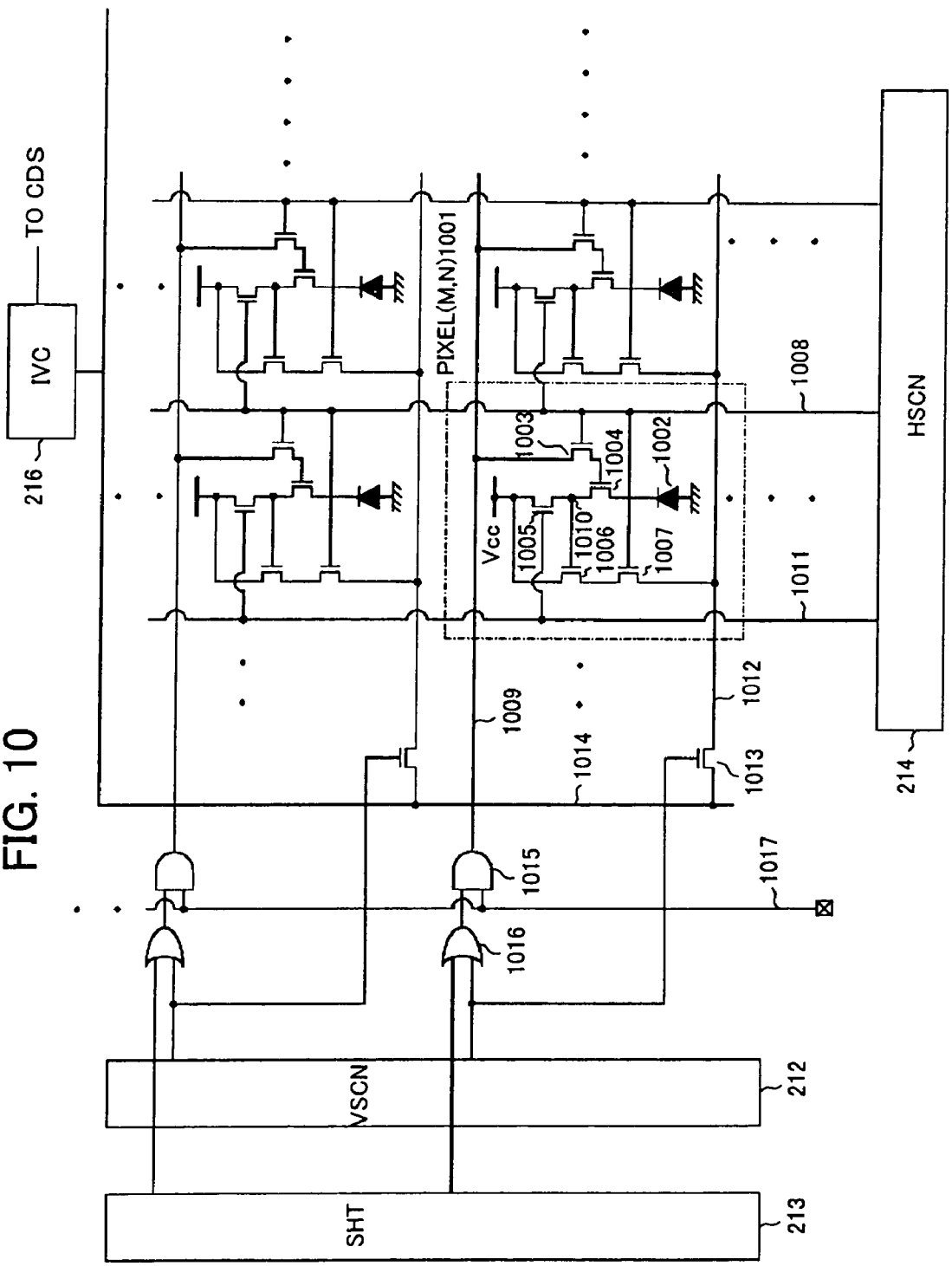
FIG. 10 is a circuit diagram concretely showing the relationship between the sensor portion of FIG. 8 and the peripheral circuits thereof.

FIG. 10 shows the configuration of the pixel array in the second embodiment and the periphery thereof. A pixel 1001 is comprised of a photo-electric conversion element 1002 and five transistors 1003 to 1007.

The role of each transistor is shown below.

The transistor 1003 has a gate connected to the column selection line (m) 1008 and a drain connected to a row selection line (n) 1009 and controls the transfer transistor 1004.

The transistor 1004 has a gate connected to the source of the transistor 1003. It controls the connection between a floating diffusion (FD) 1010 and the photo-electric conversion element 1002.

The transistor 1005 has a gate connected to one column selection line (m−1) 1011 before the column to which the pixel belongs, has the drain connected to a power supply voltage Vcc, and resets the FD 1010.

The transistor 1006 has a gate connected to the FD 1010 and carries a current in accordance with the potential of the FD 1010 through the source.

The transistor 1007 has a gate connected to the column selection line (m) 1008 to which the pixel belongs and, when becomes on, makes the source of the transistor 1006 and an output signal line 1012 from the pixel conductive.

The output signal line 1012 from the pixel row (n) is connected to a vertical signal line 1014 via a transistor 1013 in the outer circumference of the array. The gate of the transistor 1013 is connected to the interconnect for selecting the n-th row from the reading row selection circuit 212. Only the output signal line of the row selected as the reading row becomes conductive with the vertical signal line 1014.

The shutter row pixel is driven in the same way as the reading row, but the output signal line thereof and the vertical signal line are disconnected, so the pixel can be reset without outputting the signal to the outside.

The vertical signal line 1014 is connected to the latter IVC 216. The column selection lines (m−1) 1011 and (m) 1008 are connected to the interconnects for selecting the m−1-th column and the m-th column from the column selection circuit 214. The row selection line (n) 1009 is connected to the output of an AND gate 1015. The AND gate 1015 has the output of an OR gate 1016 and a transfer signal interconnect 1017 connected to it.

The OR gate 1016 has the signal interconnects for selecting the n-th row from the reading row selection circuit 212 and the shutter row selection circuit 213 connected to it. The signal of the transfer signal interconnect 1017 is input to only the row selection line 1009 of the row selected by the reading row selection circuit 212 or the shutter row selection circuit 213 by the AND gate 1015 and the OR gate 1016.

FIG. 11A to FIG. 11H are views of the states of signals input to the signal interconnects when reading from the pixel (m, n) of FIG. 10. FIG. 11A shows a state of the transfer signal TRF, FIG. 11B shows the state of an (n) selection signal selected by the reading row selection circuit 212, FIG. 11C shows the state of the signal of the row selection line (n) 1009, FIG. 11D shows the signal of the column selection lines (1) to (m−1), FIG. 11E shows the signal of the column selection line (m) 1008, FIG. 11F shows the signal of the column selection line (m+1) 1011, FIG. 11G shows the state of the pixel (m, n), and FIG. 11H shows the state of the pixel (m+1,n).

Below, a brief explanation will be given of the operation of the circuit of FIG. 10.

[1] When the reading row selection circuit 212 selects the n-th row, a high level signal is input to the row selection line (n) 1005. Further, the transistor 1013 becomes on and the output signal line 1012 and the vertical signal line 1014 become conductive.

[2] When the column selection circuit 214 selects. the column (m−1), the column selection line (m) 1008 becomes the high level, and the FD 1010 of the pixel (m, n) is reset to the power supply voltage level during this period.

[3] When the column selection circuit 214 selects the column (m), the column selection line (m) 1008 becomes the high level, the transistor 1007 of the pixel (m, n) becomes on, and a signal current of the reset level of the pixel (m, n) passes through the output signal line 1012 and the vertical signal line 1014 and is input to the IVC 216. The reset signal converted to the voltage at the IVC 216 is stored in the latter CDS circuit.

[4] The row selection signal becomes the high level, the transistor 1004 becomes on, and signal charge stored in the photo-electric conversion element 1002 is transferred to the FD 1010.

[5] After making the row selection signal the low level, the output current of the signal level is converted to voltage at the IVC 216, and the difference between the reset level and the signal level is subtracted at the CDS circuit 217.

[6] The signal after the processing at the CDS circuit 217 is processed in the AGC circuit 218, the ADC 219, the digital amplifier 220, etc. until the reset level from the pixel of the next column comes and is output to the outside of the chip.

The thinning out operation in the CMOS image sensor 200 according to the second embodiment is almost the same as the first embodiment.

After the H start signal SH is input, the selected row is advanced by m number of rows in the "set-up period of TSET of the reading and shutter row", whereby 1/m thinning out is carried out. Further, the pixels are also driven using the next column selection line, therefore the thinning out in the column direction is carried out by processing such as the read and disposal in the latter processing.

The second embodiment differs largely from the first embodiment in the following two points.

In the row selected by the reading row and the electronic shutter row, at the time of reading charges from the photo-electric conversion element 1002 in the above [4], the row selection line 1009 is driven for each pixel cycle, therefore the device is driven by an amount of the number of columns of the pixel array, for example, several hundred times or more. Accordingly, the difference of the usage frequency between the rows thinned out and the rows not thinned out at the thinning out operation appears more conspicuously. In this example, the deterioration of the driver (AND gate of FIG. 10) for driving the row selection line 1009 of the pixel becomes the problem rather than the transistor in the pixel. The transfer signal TRF (FIG. 11A) input to the row selection line 1009 is about 10 ns or very short, therefore if the shape of the drive waveform is different, a serious influence is exerted upon the output waveform from the pixel.

Further, the output signal line from the pixel extends in the horizontal direction, and the output current is read out to this signal line. Accordingly, the addition of the output currents of two rows is possible in the vertical signal line 1014 of FIG. 10. By utilizing this operation, addition while performing the addition and row thinning out of a plurality of reading rows is possible.

An explanation will be given of the ⅖ thinning out addition in relation to FIG. 12A to FIG. 12E.

As in the pixel array of FIG. 12A, odd number rows numbered 1, 3, 5, 7, . . . represent the RG rows, and even number rows 2, 4, 6, 8, . . . represent GB rows.

First, the first and third rows are simultaneously selected by the reading row selection circuit 212. The signals of two rows are added at the vertical signal line and the result is defined as the first row of RG (state 1 shown in FIG. 12B: first row of RG).

Next, the selected row is advanced by three rows, the fourth and sixth rows are selected, the signals of two rows are added, and the result is defined as the first row of GB (state 2 shown in FIG. 12C: first row of GB).

Next, the scan is carried out so that the selected row is advanced by five rows and the ninth and eleventh rows are selected. The second, fifth, seventh, and eighth rows are not selected, but two rows' worth of information is created from the first to eighth rows, so the ⅖ thinning out addition is carried out.

Even in a case where such an operation is carried out, the operation is carried out by the timing generator receiving the operation mode signal from the outside and switching the signal from the timing generator 215.

The row selection circuit 212 is configured by one or more shift registers in the same way as the case of the first embodiment and switched by the control signal (number of clocks input during the start of operation and "set-up period of the reading and shutter row"). Further, when it is configured by one decoder, it is configured so as to simultaneously select a plurality of rows. Further, the addition processing per se can be realized by using a circuit that stores and adds two rows' worth of information for each pixel column by a CMOS sensor of the type for reading from the pixels in units of rows as in the first embodiment.

In the second embodiment as well, by using the shutter row selection circuit 213 as in the first embodiment, the usage frequencies of the rows thinned out and the rows not thinned out at the thinning out operation can be made uniform.

Next, an explanation will be given of the operation of the second embodiment with respect to the above ⅖ thinning out addition in relation to FIG. 13A and FIG. 13B. For simplification, the pixel array is assumed to be comprised of 21 rows. The state of selection of the reading row and shutter row in the conventional ⅖ thinning out is expressed as in FIG. 13A.

Figure 13A:
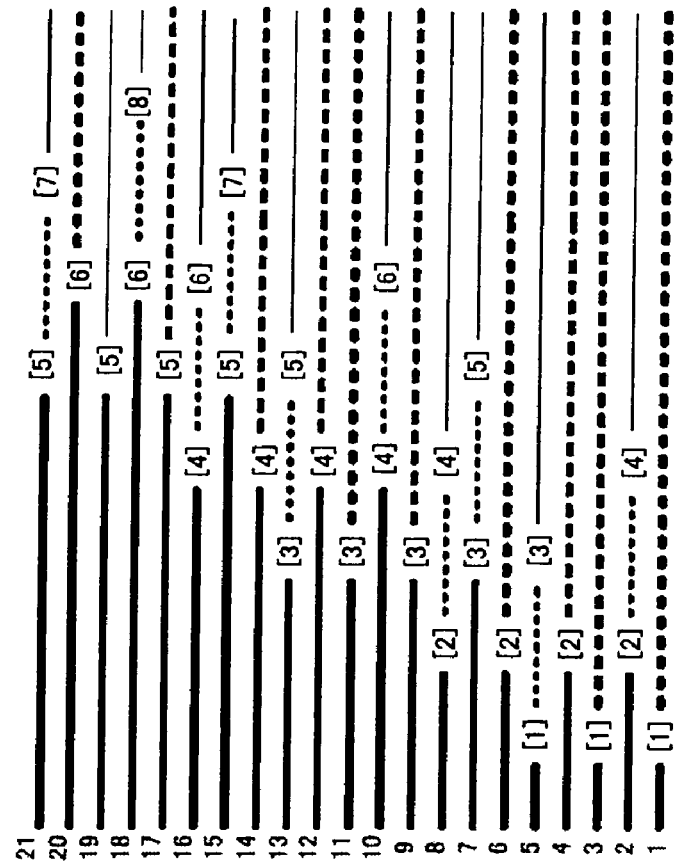
FIG. 13A and FIG. 13B are views for explaining a selection operation of each row when performing a ⅖ thinning out (including addition) operation in the CMOS image sensor shown in FIG. 8.
Figure 13B:
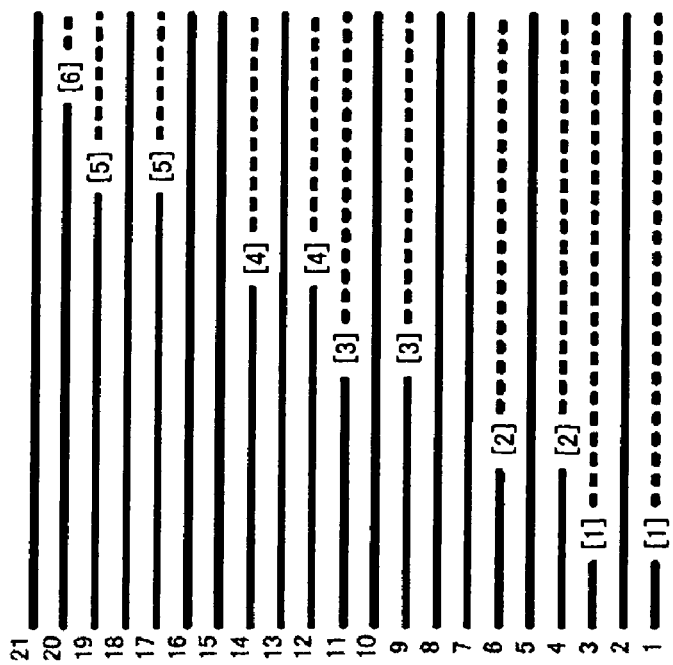

In FIG. 13A and FIG. 13B, the elapse of time is expressed in the right direction, while the numerals written in the array express the reading and shutter timings. Namely, in FIG. 13A and FIG. 13B, the state of [1] corresponds to the state 1 of FIG. 12B. The shutter is applied to the first and third rows. Alternatively, it is the state where the row is selected as the reading row, and the signals from two rows are added at the vertical signal line 1014 and the result input to the latter IVC 216.

Further, in FIG. 13A and FIG. 13B, as the selection state of each row, the state where the row is not selected even one time is expressed by a wide solid line, the row which was selected one time is expressed by a wide dotted line, and the row which was selected two times is expressed by a thin dotted line. Namely, the first and third rows are selected one time as the reading rows and selected one time as the shutter rows during one frame, but the second row and fifth rows are not selected even as the reading row and shutter row either.

As opposed to this, in the second embodiment, the drive to the shutter row selection circuit 213 is changed, and the selection state of the shutter row is made as in FIG. 13B.

In this state, the electronic shutter operation is carried out one time for rows not thinned out and two times for rows thinned out. Due to this, even at the thinning out operation, the difference of the selection frequency for each row does not occur. In the figure, the timings for the reading row and the shutter row become the same, but in actuality, the shutter row is driven in advance so as to obtain the storage time aimed at.

The case of the ⅔ thinning out addition was explained by using FIG. 13A and FIG. 13B, but the second embodiment per se is a technique which can be applied by modification of the 1/m thinning out or, as explained also in the first embodiment, the case where the ratio of the thinning out was changed or with respect to column thinning out.

Further, the all pixel reading, thinning out, and thinning out addition described above are carried and the switching of the drive described above are carried out by inputting the mode switch signal to the timing generator from the outside. The operation mode is switched by the switch of the scanning start signal, clock signal, etc. input to the row and column drive circuits (each configured by one or more shift registers or one or more decoders) from the timing generator.

As described above, in the present invention, by also inputting drive pulses into the rows thinned out at the thinning out operation, the difference of the degrees of deterioration of the rows is eliminated. Due to this, no lateral stripes are generated in the image at the time of all pixel output after performing the thinning out operation for a long time. Further, by changing the drive of the shift register and the decoder which have been conventionally used as shutter row selection circuits, the effect of a special circuit is obtained without newly using a special circuit.

INDUSTRIAL APPLICABILITY

As explained above, according to the solid-state imaging device of the present invention and the method for driving the same, drive pulses are also input to the pixel rows or pixel columns thinned out at the time of driving by the thinning out reading mode to operate the reading circuits of the pixels, therefore it becomes possible to eliminate the difference of the drive frequency between the pixels thinned out and the pixels not thinned out and make the degrees of deterioration of the transistors etc. configuring the reading circuit uniform. Therefore, the generation of stripe-like noise of the image at the time of all pixel reading can be prevented, and a good image quality can be maintained. Accordingly, the present invention can be applied to an imaging device such as a digital camera equipped with a liquid crystal screen having a thinning out mode.

The invention claimed is:

1. A solid-state imaging device including an imaging pixel portion formed by arranging a plurality of pixels each including a photo-electric conversion element and a reading circuit of the photo-electric conversion element in a matrix and having an all pixel reading mode for reading pixel signals from all pixels of the imaging pixel portion and a thinning out reading mode for selecting part of the pixels of the imaging pixel portion said solid-state imaging device comprising:

a drive circuit having a function for selecting the reading circuit in the all pixel reading mode for each pixel row or each pixel column by a drive signal, and in the thinning out reading mode inputting a drive signal also to a pixel row or a pixel column which is thinned out when driving by the thinning out reading mode, and making the reading circuit of each pixel operate, wherein said drive circuit inputs drive signals to the not thinned out pixel rows or pixel columns and thinned out pixel rows or pixel columns such that a number of operations for the reading circuits of all pixels after performing both thinning out reading and all pixel reading is at least substantially equal.

2. A solid-state imaging device as set forth in claim 1, wherein said drive circuit has:

a row selection circuit for selecting a pixel row for reading out a pixel signal and a shutter row selection circuit for selecting a pixel row for a shutter operation and inputs drive signals to thinned out pixel rows through said shutter row selection circuit at the time of driving by said thinning cut reading mode.

3. A solid-state imaging device as set forth in claim 1, wherein said drive circuit has a column selection circuit for selecting a pixel column for reading out a pixel signal, inputs drive pulses to the thinned out pixel columns through said column selection circuit, and discards the pixel signals output from the thinned out pixel columns.

4. A solid-state imaging device as set forth in claim 3, wherein said drive circuit discards pixel signals output from the thinned out pixel columns by dummy interconnects.

5. A method for driving a solid-state imaging device having a function for selecting a reading circuit of an imaging pixel portion having a plurality of pixels each including a photo-electric conversion element and a reading circuit of the photo-electric conversion element in a matrix for each pixel row or each pixel column and having an all pixel reading mode for reading pixel signals from all pixels of the imaging pixel portion and a thinning out reading mode for selecting part of the pixels of the imaging pixel portion said method comprising:

inputting a drive signal also to a pixel row or a pixel column which is thinned out when driving by the thinning out reading mode, and making the reading circuit of each pixel operate; inputting drive signals to the not thinned out pixel rows or pixel columns and thinned out rows or pixel columns such that a number of operations for the reading circuits of all pixels after performing both thinning out reading and all pixel reading is at least substantially equal.

6. A method for driving a solid-state imaging device as set forth in claim 5, further comprising inputting drive signals to thinned out pixel rows through a row selection means for selecting pixel rows for shutter operation at the time of driving by said thinning out reading mode.

7. A method for driving a solid-state imaging device as set forth in claim 5, further comprising inputting drive signals to the thinned out pixel columns through a column selection means for selecting pixel columns for reading out pixel signals and discarding the pixel signals output from the thinned out pixel columns when driving by said thinning out reading mode.

* * * * *